United States Patent [19]

Hu

[11] Patent Number: 5,223,780
[45] Date of Patent: Jun. 29, 1993

[54] MOBILE TELEPHONE BATTERY POWER SUPPLY UNIT WITH POWER DETECTION AND DISCHARGE CIRCUIT

[76] Inventor: Stephen Hu, 5F, No. 3, Alley 19, Lane 85, Sec. 3, Ta Kuan Rd., Pan Chiao, Taipei, Taiwan

[21] Appl. No.: 912,979

[22] Filed: Jul. 14, 1992

[51] Int. Cl.⁵ .................. H02J 7/00; H01M 10/46; H07M 2/00; H04Q 7/04
[52] U.S. Cl. .................................. 320/14; 320/2; 455/90; 379/61
[58] Field of Search ................. 320/13, 14, 2

[56] References Cited

U.S. PATENT DOCUMENTS

| | | |
|---|---|---|
| 4,698,579 | 10/1987 | Richter et al. ............... 320/14 |
| 4,709,202 | 11/1987 | Koenck et al. ............... 320/39 X |
| 4,803,416 | 2/1989 | Abiven et al. ............... 320/14 X |

*Primary Examiner*—R. J. Hickey
*Attorney, Agent, or Firm*—Jacobson, Price, Holman & Stern

[57] ABSTRACT

A mobile telephone battery power supply unit consisted of a housing covered with a slide cover to hold an electronic circuit assembly and battery case on the inside. The electronic circuit assembly includes a charging circuit controlled to recharge the rechargeable battery of a mobile telephone, a power detection circuit controlled to detect the current power level of the rechargeable battery of the mobile telephone, and a discharge circuit controlled to discharge the residual voltage out of the rechargeable battery of the mobile telephone before each recharging operation so as to eliminate possible "memory effect", which prohibits the rechargeable battery from being fully charged to the saturation state. The battery case receives alkaline batteries, which keep providing a constant voltage to the mobile telephone for normal operation as the rechargeable battery of the mobile telephone fails.

2 Claims, 4 Drawing Sheets

MOBILE TELEPHONE BATTERY POWER SUPPLY UNIT WITH POWER DETECTION AND DISCHARGE CIRCUIT

BACKGROUND OF THE INVENTION

The present invention relates to a mobile telephone battery power supply unit which includes a power detection circuit controlled to detect the current power level of the rechargeable battery of the mobile telephone, and a discharge circuit controlled to discharge the residual voltage out of the rechargeable battery of the mobile telephone before each recharging operation so as to eliminate possible "memory effect". The mobile telephone battery power supply unit comprises a battery case fastened inside the housing thereof and covered by a slide cover, which battery case has batteries that keep providing a constant voltage to the mobile telephone for normal operation as the rechargeable battery of the mobile telephone fails.

A variety of mobile telephones are known and widely in use for the advantage of mobility. However, a mobile telephone must be frequently recharged so that the rechargeable battery of the mobile telephone can be constantly maintained at high level for normal operation. Because of the lack of a power detection means for automatically detecting the current power level of the rechargeable battery of the conventional mobile telephone, the user may forget to recharge the rechargeable battery before it turns to low level. Furthermore, the rechargeable battery of a conventional mobile telephone is generally a nickel-cadmium cell which tends to produce a "memory effect", more particularly after a long use, causing the rechargeable battery not to be fully recharged to the saturation state.

SUMMARY OF THE INVENTION

The present invention eliminates the aforesaid problems. It is therefore an object of the present invention to provide a mobile telephone battery power supply unit which can detect the current power level of the rechargeable battery of a mobile telephone. It is another object of the present invention to provide a mobile telephone battery power supply unit which can discharge the residual voltage out of the rechargeable battery of the mobile telephone before recharging it. It is another object of the present invention to provide a mobile telephone battery power supply unit which prolongs the service life of a mobile telephone. According to one aspect of the present invention, the mobile telephone battery power supply unit is consisted of a housing covered with a slide cover to hold an electronic circuit assembly and battery case on the inside, wherein the electronic circuit assembly includes a power detection circuit controlled to detect the current power level of the rechargeable battery of the mobile telephone to which it is connected, and a discharge circuit controlled to discharge the residual voltage out of the rechargeable battery of the mobile telephone before each recharging operation so as to eliminate possible "memory effect". According to another aspect of the present invention, the battery case receives alkaline batteries, which keep providing a constant voltage to the mobile telephone for normal operation as the rechargeable battery of the mobile telephone fails.

DETAILED DESCRIPTION OF THE PREFERRED EMBODIMENT

Figure 1:
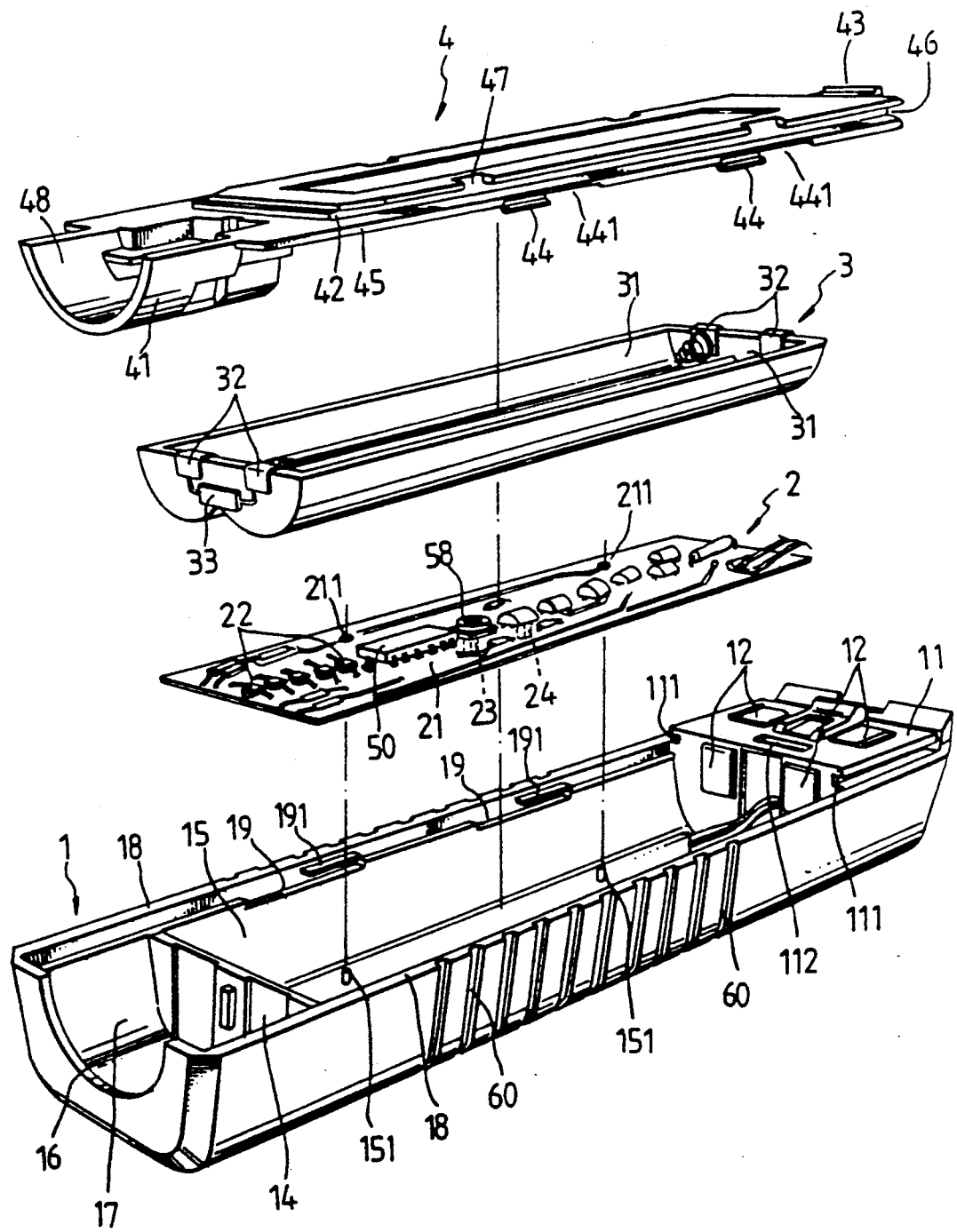
FIG. 1 is an exploded view of a mobile telephone battery power supply unit embodying the present invention.
Figure 2:
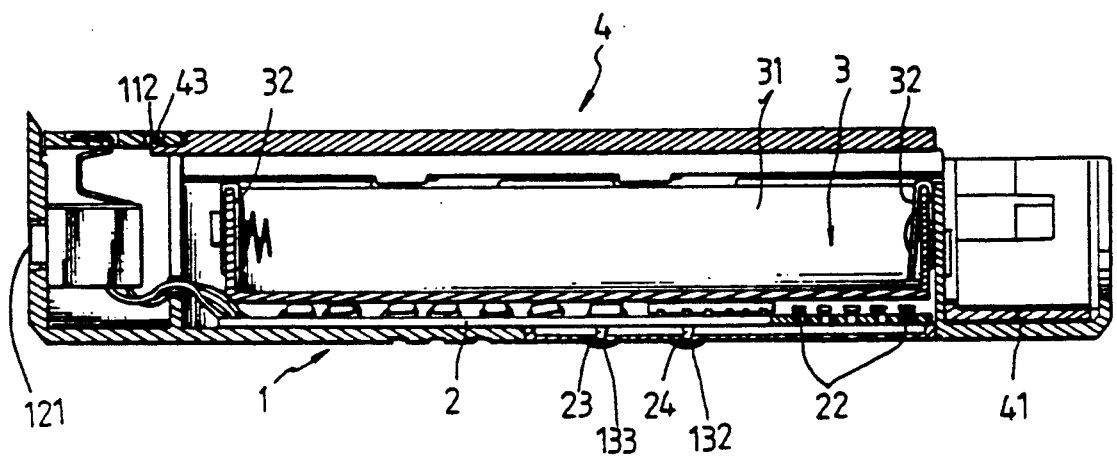
FIG. 2 is a plan assembly view thereof.

Referring to FIGS. 1 and 2, a mobile telephone battery power supply unit as constructed in accordance with the present invention is generally comprised of a housing 1, an electronic circuit assembly 2, a battery case 3, and a cover 4. The housing 1 of the mobile telephone battery power supply unit comprises a plurality of recessed, paralleled, anti-skid stripes 60 over the front panel 13 thereof. There are also provided on the front panel 13 of the housing 1, a power-indication scale 131, a power detection control button 132, a discharge control button 133, and a plurality of contacts 12 respectively arranged at suitable locations. A socket 121 is made on the bottom end of the housing 1 and electrically connected to the contacts 12. By means of the socket 121, the mobile telephone power supply unit can be connected to an external power supply outlet. There is provided a semi-circular opening 16 on the top end of the housing 1, and a mount 11 on the inside adjacent to the bottom end thereof. The mount 11 comprises a retaining hole 112 on the top, two opposite grooves 111 on two opposite sides, and contacts 12 corresponding to the contacts 12 on the front panel 13 of the housing 1. The holding space of the housing 1 is divided by a division wall 14 into a storage chamber 15, which receives the electronic circuit board 21 and the battery case 3, and a retaining chamber 17, which receives the semi-circular plug portion 41 of the cover 4. The storage chamber 15 has a plurality of posts 151 spaced on the inside for mounting the electronic circuit assembly 2. The housing 1 further comprises two substantially L-shaped peripheral bottom edges 18 on two opposite sides. There are a plurality of inwards projecting strips 191 and retaining slots 19 at the peripheral edges 18 of both sides of the housing 1. The electronic circuit assembly 2 comprises a circuit board 21 having holes 211 at locations corresponding to the posts 151 on the housing 1. By inserting the posts 151 into the holes 211 respectively, the electronic circuit board 21 is firmly retained inside the rechargeable chamber 15. The circuit board 21 of the electronic circuit assembly 2 comprises a set of indicator lamps 22, a power detection micro-switch 23 and a discharge control micro-switch 24 at locations corresponding to the power-indication scale 131, the power detection control button 132, and the discharge control button 133 on the housing 1. The battery case 3 which fits into the rechargeable chamber 15 on the housing 1 comprises two parallel channels 31 in longitudinal direction on two opposite sides for receiving batteries, of which has two conductive elements 32 on two opposite ends. A thermoelement 33 is connected in series between two adjacent conductive elements 32. The thermoelement 33 automatically cuts off the circuit as the temperature surpassed a predetermined range (for example, 80° C.) during charging of the batteries. This arrangement protects the batteries from being excessively charged. The cover 4 has a circular plug portion 41 on one end inserted into the retaining chamber 17 between the semi-circular opening 16 and the division wall 14 on the housing 1, a unitary hook 43 on an opposite end hooked in the retaining hole 112 on the mount 11 of the housing 1, two symmetrical stepped flanges 42, 45 on two opposite sides, two retaining grooves 46 on two opposite sides between the respective stepped flanges 42, 45. Each stepped flange 42, 45 includes an upper flange 42 having a plurality of spaced notches 47, and the both sides of lower flange 45 having projecting strips 44 with retaining slots 441 at locations corresponding to the projecting strips 191 and the retaining slots 19 on the peripheral bottom edges 18 of both sides of the housing 1.

Figure 3:
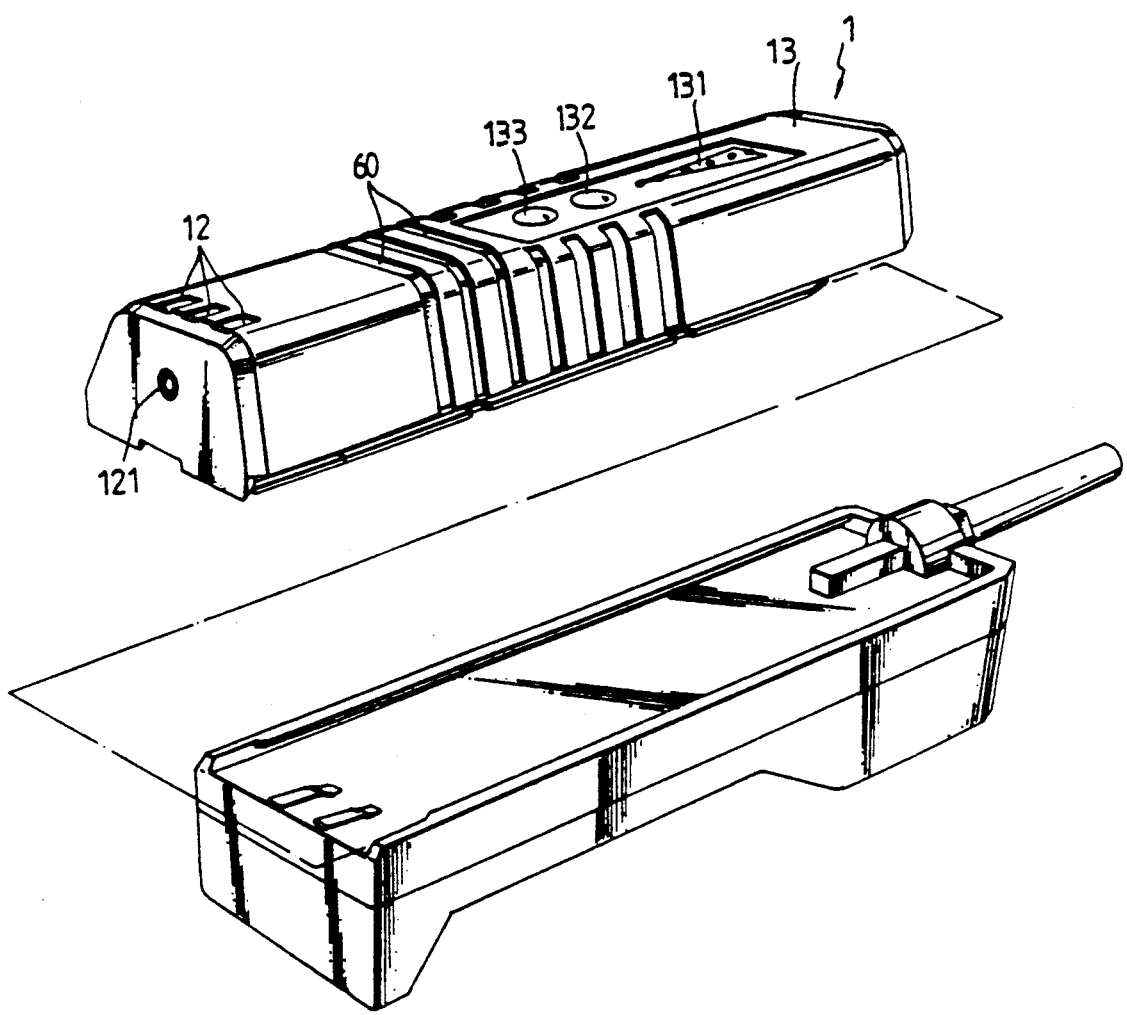
FIG. 3 illustrates that the mobile telephone battery power supply unit is to be fastened to a mobile telephone for charging its rechargeable battery.

Referring to FIGS. 2 and 3 again, the circuit board 21 of the electronic circuit assembly 2 is fastened inside the storage chamber 15 of the housing 1 with the set of indicator lamps 22, the power detection micro-switch 23 and the discharge control micro-switch 24 respectively electrically connected to the power-indication scale 131, the power detection control button 132 and the discharge control button 133. Then, the battery case 3 is inserted into the storage chamber 15 with the other two separated conductive elements 32 of the parallel channels 31 (on the end opposite to the thermoelement 33) connected to the contacts 12 on the mount 11 of the housing 1. Finally, fasten the cover 4 to the housing 1 over the battery chamber 3 permitting the projecting strips 44 of the lower flanges 45 to hook up with the projecting strips 191 by inserting the projecting strips 44 into the retaining slots 19 and then move the projecting strips 44 to under the projecting strips 191 for combination, the hook 43 to hook in the retaining hole 112 on the mount 11 of the housing 1, and the semi-circular plug portion 41 to insert into the retaining chamber 17 on the housing 1. By means of the upper flanges 42, the mobile telephone power supply unit is fastened to a mobile telephone 5. When assembled, the antenna holder of the mobile telephone 5 is received in the semi-circular opening 48 on the, and the contacts 12 on the mount 11 of the housing 1 are respectively connected to the respective spring contacts on the mobile telephone to form into a closed circuit for providing the mobile telephone 5 with power supply.

Figure 4:
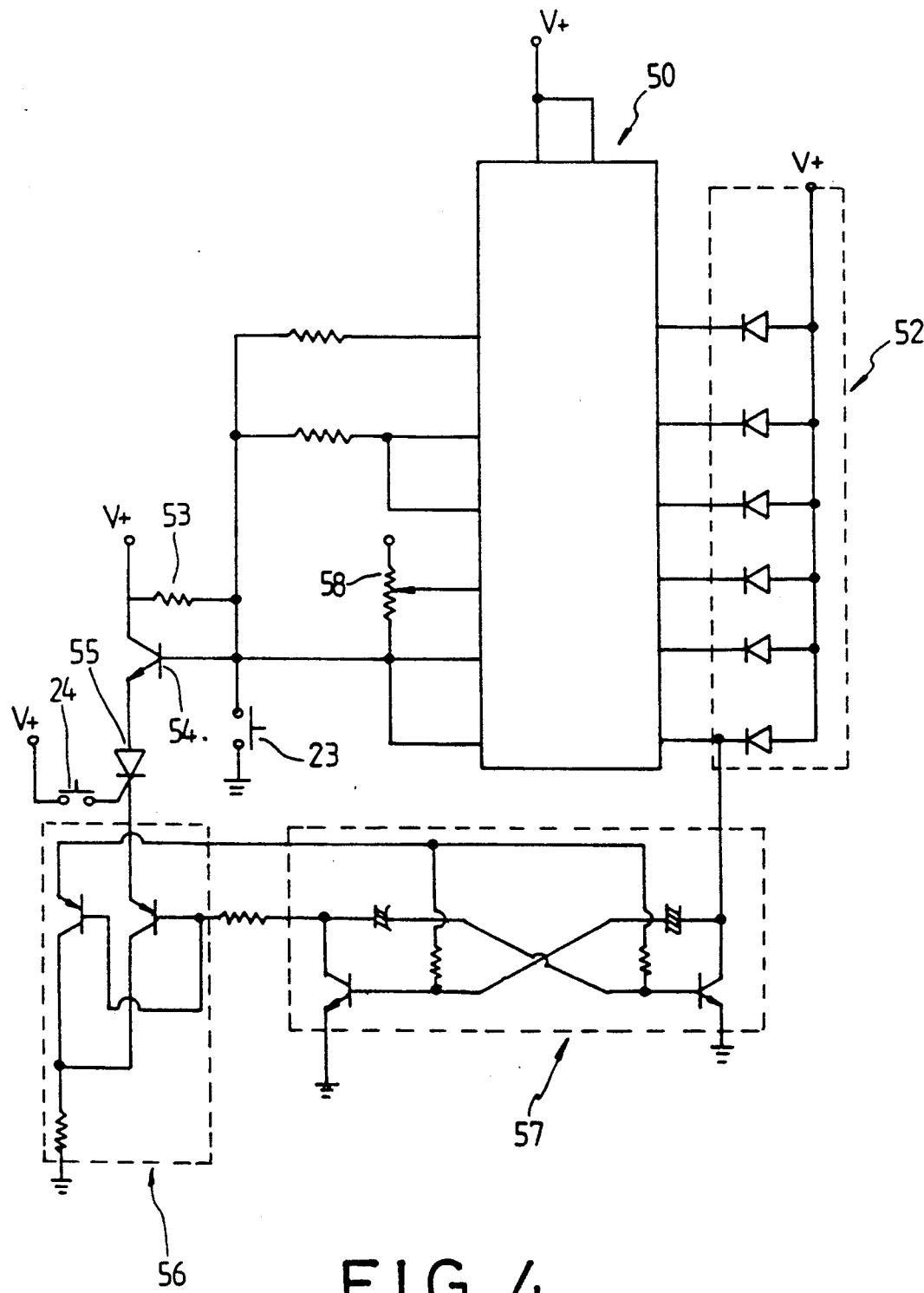
FIG. 4 is a circuit diagram of the mobile telephone battery power supply unit.

Referring to the circuit diagram of present invention as shown in FIG. 4, the third and ninth pins of the driving circuit 50 are connected to an external voltage (reference voltage) which is connected to the positive terminals of the light emitting diodes (set of indicator lamps) 52. The negative terminals of the light emitting diodes 52 are respectively connected to the input terminal of the driving circuit 50. The sixth, seventh and fourth pins of the driving circuit 50 are connected in parallel and then connected to a resistor 53, the base of a n-p-n transistor 54 and the power detection micro-switch 23. The fifth pin of the driving circuit 50 is connected to the variable terminal of a variable resistor 58, which is connected to an external voltage to provide a constant voltage. The variable resistor 58 has an opposite end connected in parallel to the eighth and second pins of the driving circuit 50 and also connected to the resistor 53, the base of the n-p-n transistor 54 and the power detection micro-switch 23. The resistor 53 and the collector of the n-p-n transistor 54 are connected to the external voltage. The emitter of the n-p-n transistor 54 is connected to the positive terminal of a thyristor 55.

The thyristor 55 has its gate pulse terminal connected to the external voltage via the discharge control micro-switch 24, and its negative terminal connected to an oscillator circuit 57 via a discharge circuit 56. The oscillator circuit 57 has its earth terminal connected to the negative terminal of one of the light emitting diodes 52 via a transistor (not indicated).

The driving circuit 50 does not work under normal conditions. However, switching on the power detection micro-switch 23 causes the driving circuit 50 to be electrically connected. Once the driving circuit 50 is electrically connected, the external voltage provided through the third and ninth pins of the driving circuit 50 is compared with the reference voltage at the fifth pin. The driving circuit 50 turns on most of light emitting diodes 52 as the external voltage surpassed the reference voltage (the number of the light emitting diodes 52 to be turned on is determined according to the extent of the external voltage surpassed the reference voltage). On the contrary, less number of the light emitting diodes 52 will be turned on. Therefore, the capacity of the electric energy of the batteries (the external voltage) is detected according to the number of the light emitting diodes 52 being turned on.

The rechargeable battery of a mobile telephone is generally of a nickel-cadmium cell which tends to produce a "memory effect", more particularly after a long use, causing a small amount of electric energy constantly maintained on the inside. Because of the "memory effect", a nickel-cadmium cell can not be recharged to the saturation state. This problem of "memory effect" is eliminated from the present invention by mean of the operation of the discharge circuit 56 and the oscillator circuit 57. Switching on the discharge control micro-switch 24 produces a voltage to the gate pulse terminal of the thyristor 55, causing the thyristor 55 to be electrically connected. Once the thyristor 55 was electrically connected, the residual voltage of the rechargeable battery of the connected mobile telephone is charged to the discharge circuit 56. The oscillator circuit 57 oscillate intermittently to produce a discharge cycle for the discharge circuit 56 permitting it to discharge intermittently. Therefore, the residual voltage of the rechargeable battery of the mobile telephone can be completely discharged. As indicated, the earth terminal of the oscillator circuit 57 is connected to the negative terminal of one of the light emitting diodes 52, therefore the light emitting diodes 52 flash according to the frequency of oscillation of the oscillator circuit 57. Once the residual voltage of the rechargeable battery of the mobile telephone has been completely discharged, the light emitting diodes 52 are stopped from flashing, and the rechargeable battery of the mobile telephone can be recharged again. The aforesaid arrangement completely eliminates the problem of "memory effect", and therefore the present invention greatly increases the capacity of a rechargeable battery and simultaneously prolongs its service life.

What is claimed is:

1. A mobile telephone battery power supply unit comprising:
   a housing, said housing comprising a plurality of recessed, paralleled, anti-skid stripes over a front panel thereof, said front panel having a plurality of contacts connected to a power socket on a bottom end thereof, a semi-circular opening on a top end thereof, a mount on the inside adjacent to the bottom end, said mount comprising a retaining hole on a top edge thereof, two opposite grooves on two opposite sides and a plurality of contacts respectively connected to the contacts on said front panel, a storage chamber and a retaining chamber divided by a division wall, said storage chamber comprising a plurality of spaced posts, and two substantially L-shaped peripheral bottom edges on two opposite sides, said two substantially L-shaped peripheral bottom edges comprising each a plurality of inwards projecting strips with retaining slots;

an electronic circuit assembly consisted of a charging circuit, a discharge circuit and an oscillator circuit respectively mounted on a circuit board, said circuit board fitted into said storage chamber and having holes into which said posts of said storage chamber insert respectively;

a battery case fitted into said storage chamber above said electronic circuit assembly, said battery case comprising two parallel battery channels which receive batteries, said parallel battery channels having each two conductive elements on two opposite ends, the two conductive elements on one end being connected by a thermoelement, said thermoelement being electrically disconnected as the temperature surpassed a predetermined range;

a cover covered on said housing over said battery case, said cover comprising a circular plug portion on one end inserted into said retaining chamber between said semi-circular opening and said division wall, a unitary hook on an opposite end hooked in the retaining hole on said mount, and two symmetrical stepped flanges on two opposite sides, said stepped flanges comprising each an upper flange and a lower flange, said upper flange having a plurality of spaced notches for fastening a mobile telephone, said lower flange having a plurality of projecting strips with retaining slots respectively hooked up with the projecting strips and the retaining slots on said peripheral bottom edges of said housing; and wherein said circuit board of said electronic circuit assembly has a set of indicator lamps, a power detection micro-switch and a discharge control micro-switch respectively disposed below a power-indication scale, a power detection control button and a discharge control button on the front panel of said housing for zero power indication, power detection control and mobile telephone rechargeable battery discharge control respectively.

2. The mobile telephone battery power supply unit according to claim 1, wherein said electronic circuit assembly is consisted of a driving circuit, a discharge circuit and an oscillator circuit, said driving circuit being connected to a set of light emitting diodes through an external voltage, said driving circuit having pins connected in parallel, and then connected to a first resistor, the base of a n-p-n transistor and said power detection micro-switch, a pin connected to the variable terminal of a variable resistor to provide a set voltage for comparison with said external voltage, said variable resistor having an opposite end connected in parallel to pins of said driving circuit and also connected to said resistor, the base of said n-p-n transistor and said power detection micro-switch, said first resistor and the collector of said n-p-n transistor being connected to said external voltage, the emitter of said n-p-n transistor being connected to the positive terminal of a thyristor, the gate pulse terminal and negative terminal of said thyristor being respectively connected to said external voltage via said discharge control micro-switch and said oscillator circuit via said discharge circuit, the earth terminal of said oscillator circuit being connected to the negative terminal of one of said light emitting diodes via a n-p-n transistor.

* * * * *